United States Patent [19]

Murakami et al.

[11] Patent Number: 5,972,492
[45] Date of Patent: *Oct. 26, 1999

[54] FOAMED PAD MATERIAL FOR LOW-PRESSURE COMPRESSION MOLDING

[75] Inventors: Masaharu Murakami; Akira Uchiyama, both of Ichihara; Koichi Kusakawa, Komagane; Shigeki Ichimura, Komagane; Shinobu Haga, Komagane, all of Japan

[73] Assignees: Mitsui Chemicals, Inc., Tokyo; NHK Spring Co., Ltd., Yokohama, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/709,849

[22] Filed: Sep. 10, 1996

[30] Foreign Application Priority Data

Sep. 12, 1995 [JP] Japan ..................................... 7-234336

[51] Int. Cl.$^6$ ................................ B32B 5/18; C08L 9/00; C08L 23/16
[52] U.S. Cl. ..................................... 428/318.8; 428/319.7; 428/319.9; 521/134; 521/140; 525/240
[58] Field of Search ..................................... 521/134, 139, 521/140; 525/240; 428/304.4, 318.6, 318.8, 319.7, 319.9, 220

[56] References Cited

U.S. PATENT DOCUMENTS

| | | | |
|---|---|---|---|
| 4,212,787 | 7/1980 | Matsuda et al. | 521/134 X |
| 4,338,271 | 7/1982 | Kumasaka et al. | 264/54 |
| 4,421,867 | 12/1983 | Nojiri et al. | 521/134 X |
| 5,071,886 | 12/1991 | Aoshima et al. | 521/89 |

FOREIGN PATENT DOCUMENTS

| | | |
|---|---|---|
| 01196103 | 7/1989 | Japan . |
| 04055039 | 3/1992 | Japan . |

*Primary Examiner*—Blaine Copenheaver
*Attorney, Agent, or Firm*—Sherman and Shalloway

[57] ABSTRACT

A foamed pad material for low-pressure compression molding which comprises a crosslinked rubbery olefinic soft resin foam and exhibits (a) a hysteresis loss of not greater than 40%, (b) a gel fraction of 20 to 98%, and (c) a density of 0.025 to 0.30 g/cm$^3$. This foamed pad material is excellent in heat weldability with core forming materials and exhibits excellent heat resistance, strain resistance, moldability and restoring properties at the time of low-pressure compression molding at which compression and drawing are carried out at high temperatures. Moreover, the foamed pad material can allow the molded skin material to have cushioning properties with high flexibility and further to have improved feeling.

22 Claims, 1 Drawing Sheet

FOAMED PAD MATERIAL FOR LOW-PRESSURE COMPRESSION MOLDING

FIELD OF THE INVENTION

The present invention relates to a foamed pad material for low-pressure compression molding suitable for use in vehicle interior materials such as car door trims, instrument panels and consoles.

The terminology "low-pressure compression molding" used herein means the compression molding methods in which the mold clamping pressure applied at the time of molding is not higher than 100 kgf/cm². Examples of these compression molding methods include the hot stamping molding method indicative of the compression or injection method and the sheet stamping method. The most typical of these molding methods is the injection employing stamping molding method.

BACKGROUND OF THE INVENTION

Among the common methods of molding vehicle interior materials such as car door trims, instrument panels and consoles, the hot stamping method is widely employed as the low-pressure compression molding characterized in that the molding cycle time is short, energy can be saved and no adhesive use is needed. The most typical of the conventional vehicle interior materials molded by the hot stamping molding method is one obtained by piling up a skin material, a foamed pad material and a core material in this order and integrally molding the pile according to the hot stamping molding method.

In recent years, there is a demand for improvements of human safety and comfortableness in feeling, etc. with respect to the above vehicle interior material comprising a core material and a skin material and, interposed therebetween, a foam layer composed of a foamed pad material for providing the skin material with cushioning properties. Thus, the skin material as a structural part of the interior material is required to possess cushioning properties with high flexibility.

A conventionally employed foamed pad material for hot stamping molding to be used in the vehicle interior material with cushioning properties is composed of a crosslinked resin foam whose principal component is polypropylene.

However, the above foamed pad material composed of the crosslinked foam cannot withstand compressive force at high temperatures during the hot stamping molding, so that cell shrinkage and rupture occur to thereby reduce the thickness of the foamed pad material, that is, cause unfavorable permanent set. Thus, after the molding, the skin material is likely to have poor flexibility and become hard with the result that the foamed pad material cannot be provided with cushioning properties with high flexibility.

The inventors studied the use as a foamed pad material of a polyolefin foam whose expansion ratio was increased and further a flexible polyethylene foam in order to improve the flexibility and cushioning properties of the skin material. However, the foamed pad materials composed of these foams without exception suffered from thickness decreases, namely, grave permanent set when molded according to the hot stamping molding method and hence entirely lacked practicability.

Proposals for overcoming the above thickness decrease and permanent set encountered with the pad material during the hot stamping molding were presented in, for example, Japanese Patent Laid-Open Publication No. 5(1993)-254035 and Japanese Patent Publication No. 6(1994)-78449.

However, the proposals of the above literature for overcoming the thickness decrease and permanent set of the pad material are applicable only to the foamed pad material which is composed of a resin whose principal component is polypropylene and which has expansion ratio of not greater than 15 for hot stamping molding in order to prevent the thickness decrease and permanent set. Hence, after the molding, the skin material still tends to lack flexibility and remain hard, so that cushioning properties with high flexibility have not yet been realized.

Therefore, it is desired to develop a foamed pad material for hot stamping molding which is excellent in heat weldability with core material forming resins and which not only exhibits excellent heat resistance, strain resistance and moldability at the time of hot stamping molding at which compression and drawing are conducted at high temperatures but also enables the molded skin material to possess cushioning properties with high flexibility.

OBJECT OF THE INVENTION

It is an object of the present invention to resolve the above drawbacks of the prior art. Specifically, it is an object of the present invention to provide a foamed pad material for low-pressure compression molding which is excellent in heat weldability with core material forming resins and which not only exhibits excellent heat resistance, strain resistance and moldability at the time of low-pressure compression molding such as hot stamping molding at which compression and drawing are conducted at high temperatures but also enables the molded skin material to possess cushioning properties with high flexibility.

SUMMARY OF THE INVENTION

The foamed pad material for low-pressure compression molding according to the present invention comprises a crosslinked rubbery olefinic soft resin foam and exhibits:

(a) a hysteresis loss of not greater than 40%,
(b) a gel fraction of 20 to 98%, and
(c) a density of 0.025 to 0.30 g/cm³.

DETAILED DESCRIPTION OF THE INVENTION

Figure 1:
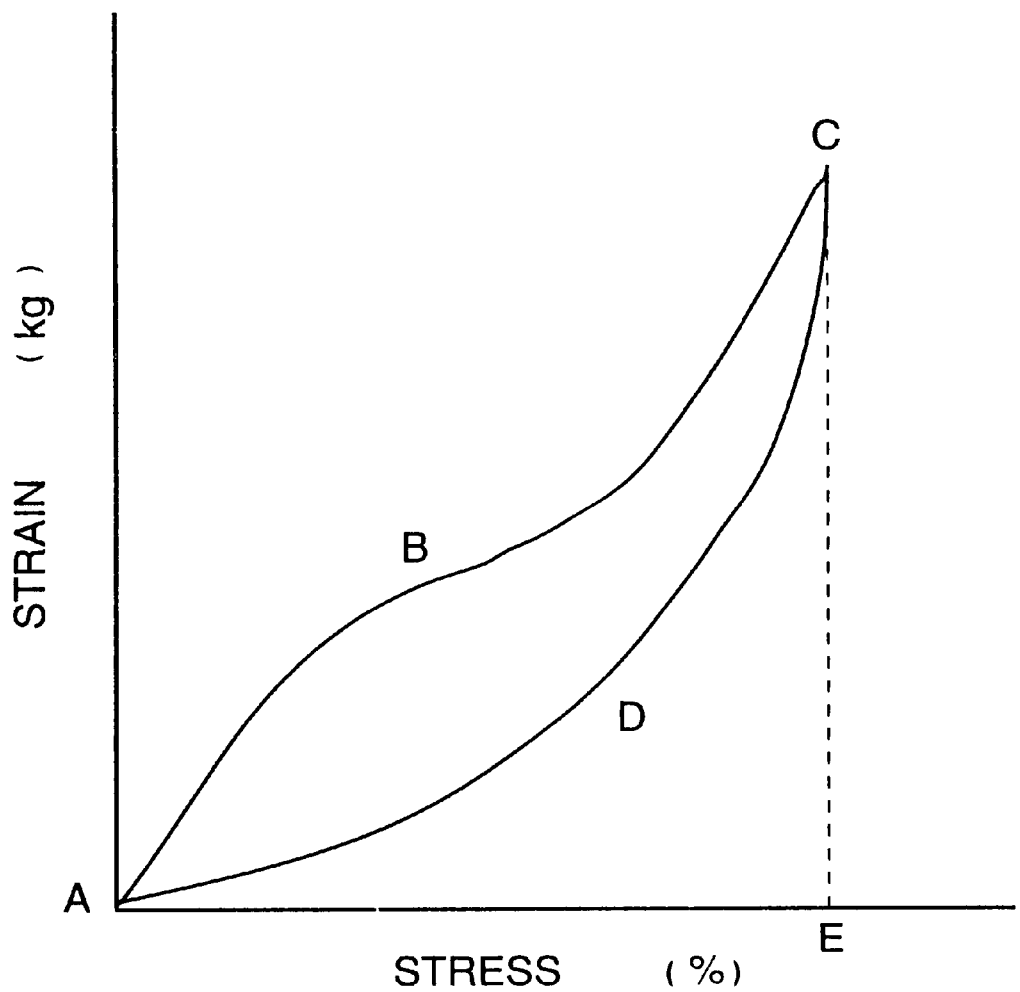
FIG. 1 is a graph showing stress-strain curves given for describing how to determine the hysteresis loss.

The foamed pad material for low-pressure compression molding according to the present invention will be described in detail below.

The foamed pad material for low-pressure compression molding according to the present invention comprises a crosslinked rubbery olefinic soft resin foam.

Rubbery Olefinic Soft Resin

Rubber, preferably, an olefinic copolymer rubber or a blend of crystalline polyolefin resin and rubber, still preferably, a blend of crystalline polyolefin resin and olefinic copolymer rubber is used as the rubbery olefinic soft resin for forming the above crosslinked foam.

The above blend of crystalline polyolefin resin and olefinic copolymer rubber has high rubber elasticity, and the use of this blend as the rubbery olefinic soft resin enables obtaining a foamed pad material which can exhibit excellent restoring properties attributed to rubber elasticity at the time of hot stamping molding.

Although the rubber for use in the present invention is not particularly limited, it is preferred that the olefinic copolymer rubber be used as mentioned above.

Examples of olefinic copolymer rubbers suitable for use in the present invention include amorphous random elastic copolymers wherein the content of α-olefin having 2 to 20 carbon atoms is at least 50 mol %. The suitable olefinic copolymer rubbers are, for example, an amorphous α-olefin copolymer prepared from a plurality of α-olefins and an α-olefin/nonconjugated diene copolymer prepared from a plurality of α-olefins and nonconjugated diene.

Specific examples of the above olefinic copolymer rubbers include the following rubbers:

(1) ethylene/α-olefin copolymer rubber
   (molar ratio of ethylene to α-olefin: about 90/10 to 50/50),
(2) ethylene/α-olefin/nonconjugated diene copolymer rubber
   (molar ratio of ethylene to α-olefin: about 90/10 to 50/50),
(3) propylene/α-olefin copolymer rubber (molar ratio of propylene to α-olefin: about 90/10 to 50/50) and
(4) butene/α-olefin copolymer rubber (molar ratio of butene to α-olefin: about 90/10 to 50/50).

Examples of the above α-olefins include ethylene, propylene, 1-butene, 1-pentene, 4-methyl-1-pentene, 1-hexene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene and combinations of these.

Examples of the above nonconjugated dienes include dicyclopentadiene, 1,4-hexadiene, cyclooctadiene, methylenenorbornene and ethylidenenorbornene.

It is preferred that the above copolymer rubbers have a Mooney viscosity [$ML_{1+4}$(100° C.)] of 10 to 250, especially, 40 to 150.

The above ethylene/α-olefin/nonconjugated diene copolymer rubber (2) is preferred to have an iodine value of not greater than 25.

Of the above olefinic copolymer rubbers, the use of the ethylene/propylene/nonconjugated diene rubber is especially preferred.

The above olefinic copolymer rubber can be present in all presumable states, for example, in the state of being not yet crosslinked, partially crosslinked or entirely crosslinked in an unfoamed rubbery olefinic soft resin composed of a blend of olefinic copolymer rubber and crystalline polyolefin resin.

The rubber suitable for use in the present invention is not limited to the above olefinic copolymer rubber and includes other rubbers, for example, diene rubbers such as styrene/butadiene rubber (SBR), nitrile rubber (NBR), natural rubber (NR) and butyl rubber (IIR), styrene/(ethylene/butylene)/styrene copolymer (SEBS) and polyisobutylene.

With respect to the blend of olefinic copolymer rubber and crystalline polyolefin resin for use in the present invention, it is preferred that the olefinic copolymer rubber be employed in an amount of 30 to less than 100 parts by weight, especially, 50 to less than 100 parts by weight and, still especially, 65 to 95 parts by weight per 100 parts by weight of the above blend.

Examples of the crystalline polyolefin resins suitable for use in the present invention include homopolymer and copolymers of an α-olefin having 2 to 20 carbon atoms.

Specific examples of the above crystalline polyolefin resins include the following homopolymers, and copolymers:

(1) ethylene homopolymer (produced by the low pressure or high pressure process whichever can be chosen),
(2) copolymers prepared from ethylene and up to 10 mol % of another α-olefin or a vinyl monomer such as vinyl acetate or ethyl acrylate,
(3) propylene homopolymer,
(4) random copolymers prepared from propylene and up to 10 mol % of another α-olefin,
(5) block copolymers prepared from propylene and up to 30 mol % of another α-olefin,
(6) 1-butene homopolymer,
(7) random copolymers prepared from 1-butene and up to 10 mol % of another α-olefin,
(8) 4-methyl-1-pentene homopolymer, and
(9) random copolymers prepared from 4-methyl-1-pentene and up to 20 mol % of another α-olefin.

Examples of the above α-olefins are the same as set forth above with respect to the formation of the olefinic copolymer rubber.

With respect to the blend of olefinic copolymer rubber and crystalline polyolefin resin for use in the present invention, it is preferred that the crystalline polyolefin resin be employed in an amount of less than 70 parts by weight, especially, less than 50 parts by weight and, still especially, 5 to 35 parts by weight per 100 parts by weight of the above blend.

For example, styrene/butadiene rubber, polybutadiene rubber or chlorinated polyethylene may be added as a modifier of the above blend of olefinic copolymer rubber and crystalline polyolefin resin in an amount of not greater than 10% by weight based on the total weight of the olefinic copolymer rubber and crystalline polyolefin resin.

Further, for example, a paraffinic, naphthenic or aromatic softening agent or an esteric plasticizer may be added for rendering the above blend soft in an amount of not greater than 10% by weight based on the total weight of the olefinic copolymer rubber and crystalline polyolefin resin.

The foamed pad material of the present invention is a crosslinked foam of rubbery olefinic soft resin, as mentioned above. Thus, generally, a foaming agent and a crosslinking agent are added to the soft resin. However, when the crosslinking of the resin is conducted by irradiating the same with ionizing radiation such as electron beam, neutron beam, alpha rays, beta rays, gamma rays, X-rays or ultraviolet rays, no crosslinking agent is added to the resin. The resin can be foamed by the vapor pressure of a volatile solvent, water or the like in place of the foaming agent.

Examples of the foaming agents preferably employed in the present invention include thermally decomposable foaming agents which are decomposed by heat to thereby generate gases, such as diethyl azocarboxylate, azodicarbonamide, barium azodicarboxylate, 4,4-oxybis(benzenesulfonohydrazide), 3,3-disulfonohydrazinophenylsulfonic acid and N,N-dinitrosopentamethylenetetramine.

The foaming agent is used in an amount of, generally, 3 to 25 parts by weight, preferably, 5 to 20 parts by weight and, still preferably, 7 to 15 parts by weight per 100 parts by weight of the entire matrix of unfoamed rubbery olefinic soft resin.

In the present invention, the crosslinking can be conducted by conventional methods. Representative examples of thermal crosslinkings in which the crosslinking agent is used include sulfur vulcanization and peroxide crosslinking. Further, ionizing radiation crosslinking can also be conducted by the conventional method.

Examples of the crosslinking agents preferably employed in the peroxide crosslinking include organic peroxides such as dicumyl peroxide, di-tert-butyl peroxide, 2,5-dimethyl-2,5-di(tert-butylperoxy)hexane, 2,5-dimethyl-2,5-di(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butyl perbenzoate, tert-butyl peroxyisopropyl carbonate, diacetyl peroxide, lauroyl peroxide and tert-butyl cumyl peroxide.

Of these, from the viewpoint of odor and scorch resistance, 2,5-dimethyl-2,5-di(tert-butylperoxy)hexane, 2,5-dimethyl-2,5-di(tert-butylperoxy)hexyne-3, 1,3-bis(tert-butylperoxyisopropyl)benzene, 1,1-bis(tert-butylperoxy)-3,3,5-trimethylcyclohexane and n-butyl-4,4-bis(tert-butylperoxy)valerate are preferred and 1,3-bis(tert-butylperoxyisopropyl)benzene is most especially preferred.

In general, the organic peroxide is used in an amount of, preferably, about 0.5 to 2.5 parts by weight per 100 parts by weight of the entire matrix of unfoamed rubbery olefinic soft resin. The practical amount of organic peroxide added is regulated taking into account a balance of, for example, hysteresis loss, gel fraction and density of the foam.

In the present invention, the above crosslinking with the use of the organic peroxide can be conducted in the presence of a crosslinking auxiliary. Examples of suitable crosslinking auxiliaries include peroxy crosslinking auxiliaries such as sulfur, p-quinone dioxime, p,p'-dibenzoylquinone dioxime, N-methyl-N-4-dinitrosoaniline, nitrosobenzene, diphenylguanidine and trimethylolpropane-N,N'-m-phenylenedimaleimide, divinylbenzene, triallyl cyanurate, polyfunctional methacrylate monomers such as ethylene glycol dimethacrylate, diethylene glycol dimethacrylate, polyethylene glycol dimethacrylate, trimethylolpropane trimethacrylate and allyl methacrylate, and polyfunctional vinyl monomers such as vinyl butyrate and vinyl stearate. The addition of the crosslinking auxiliary enables regulating the gel fraction of the foam.

According to necessity, the rubbery olefinic soft resin for use in the present invention can be loaded with various additives customarily used in olefinic thermoplastic elastomer compositions, such as a crosslinking auxiliary, a crosslinking accelerator, a foaming auxiliary, a weathering stabilizer, a heat stabilizer, a plasticizer, a flame retardant, a thickener, a lubricant and a colorant in an amount such that the addition is not detrimental to the object of the present invention.

Moreover, the above rubbery olefinic soft resin can be loaded with a filler.

Examples of suitable fillers include organic fillers such as carbon black, nitroso pigment, iron oxide red, phthalocyanine pigment, pulp, fibrous chip and agar and inorganic fillers such as clay, kaolin, silica, diatom earth, aluminum hydroxide, zinc oxide, magnesium hydroxide, calcium oxide, magnesium oxide, titanium oxide, mica, bentonite, shirasu balloon, zeolite, clay silicate, cement and silica fume.

Foamed Pad Material

The foamed pad material for low-pressure compression molding according to the present invention is the crosslinked foam of rubbery olefinic soft resin composed of the above components, and the hysteresis loss thereof is not greater than 40%, preferably, not greater than 30%.

The use of the foamed pad material whose hysteresis loss is not greater than 40% enables reducing unfavorable permanent set at the time of hot stamping molding of the foamed pad material, thereby allowing the molded skin material to possess cushioning properties with high flexibility. Further, the use of the foamed pad material whose hysteresis loss is not greater than 30% enables the skin material having undergone the hot stamping molding to have very excellent feeling.

Even if the foamed pad material is composed of the resin of the same composition, the hysteresis loss of the foamed pad material is varied depending on, for example, the closed cell ratio, gel fraction and cell quantity of the foam. However, excellent feeling can be realized when the hysteresis loss as an index for rubber elasticity is not greater than 40%, although, even if the hysteresis loss is not greater than 40%, an uncrosslinked foamed pad material would have poor hot stamping moldability and would be of no avail.

The method of determining the hysteresis loss will be described later in the part "Preferred Embodiment".

With respect to the foamed pad material for low-pressure compression molding according to the present invention, further, the gel fraction as an index of the degree of crosslinking which is measured in xylene heated at 130° C. ranges from 20 to 98%, preferably, from 40 to 90% and, still preferably, from 50 to 85%. The foamed pad material whose gel fraction falls within the above range not only enables exhibiting satisfactory restoring properties, minimized permanent set and excellent moldability at the time of hot stamping molding but also enables the molded skin material to have cushioning properties with high flexibility. A hot lamination or heat fusion of the foamed pad material whose gel fraction falls within the above range along with a skin material and a core material forming resin enables obtaining a vehicle interior material in which the foamed pad material is welded to the skin material and the foamed pad material welded to the core material forming resin with high strengths. The method of determining the gel fraction will be described later in the part "Preferred Embodiment".

The foamed pad material for low-pressure compression molding according to the present invention has a density ranging from 0.025 to 0.30 g/cm$^3$. The foamed pad material whose density falls within the above range enables the skin material having undergone the hot stamping molding to have cushioning properties with high flexibility. The method of determining the density will be described later in the part "Preferred Embodiment".

It is preferred that the foamed pad material for low-pressure compression molding according to the present invention have a 50% compression stress ranging from 0.3 to 1.5 kgf/cm$^2$, especially, from 0.3 to 1.3 kgf/cm$^2$. The foamed pad material whose 50% compression stress falls within the above range not only enables minimizing unfavorable permanent set at the time of hot stamping molding but also enables the molded skin material to have cushioning properties with high flexibility. The method of determining the 50% compression stress will be described later in the part "Preferred Embodiment".

It is preferred that the foamed pad material for low-pressure compression molding according to the present invention have a closed cell ratio ranging from 5 to 95%, especially, from 10 to 93% and, still especially, 30 to 90%. The foamed pad material whose closed cell ratio falls within the above range not only enables minimizing unfavorable permanent set at the time of hot stamping molding but also enables the molded skin material to have cushioning properties with high flexibility.

It is preferred that the crystallinity measured by X-ray diffractometry of the foamed pad material for low-pressure compression molding according to the present invention range from 3 to 30%, especially, from 3 to 25% and, still especially, 3 to 20%. The foamed pad material whose crystallinity falls within the above range not only enables minimizing permanent set at high temperatures and exhibiting excellent moldability at the time of hot stamping molding but also enables the molded skin material to have cushioning properties with high flexibility. A hot lamination or heat fusion of the foamed pad material whose crystallinity falls within the above range along with a skin material and a core material forming resin enables obtaining a vehicle interior material in which the foamed pad material is welded to the skin material and the foamed pad material is welded to the core material forming resin with high strengths.

Preparation of Foamed Pad Material

The foamed pad material for low-pressure compression molding according to the present invention can be prepared by the following process.

First, the above components are uniformly blended together to thereby obtain an unfoamed uncrosslinked rubbery olefinic soft resin, and this resin is formed into a predetermined shape.

The unfoamed uncrosslinked rubbery olefinic soft resin can be obtained, for example, by individually melt kneading a thermally decomposable foaming agent, a crosslinking agent and other additives into a matrix composed of either a blend of olefinic copolymer rubber and crystalline polyolefin resin or an olefinic copolymer rubber.

In this method, for example, an olefinic copolymer rubber and a crystalline polyolefin resin are first kneaded together by any of common kneaders such as the twin-cylinder Brabender, tumbling Brabender, ribbon Brabender and Henschel Brabender. According to necessity, further, the resultant blend is kneaded by means of an extruder, a mixing mill, a kneader, a Banbury mixer or the like.

It is preferred that the above kneading be conducted at temperatures lower than the decomposition point of the thermally decomposable foaming agent. Additives such as a foaming auxiliary, a wetting agent, a weathering stabilizer, a heat stabilizer, an antioxidant and a colorant and further a filler can be added to the blend at any of the above melt kneading steps.

Subsequently, the blend obtained by the above kneading is loaded with a crosslinking agent, according to necessity, together with a crosslinking auxiliary, a vulcanization accelerator, etc. and uniformly kneaded together by means of common kneading equipment such as the twin-cylinder Brabender, tumbling Brabender, ribbon Brabender or Henschel Brabender, preferably, at temperatures 50° C. lower than the decomposition point of the crosslinking agent. The resultant blend is transferred to common kneading equipment such as an open mixing mill, a closed Banbury mixer, an extruder, a kneader or a continuous mixer to complete kneading dispersion of the crosslinking agent, etc.

It is preferred that the above kneading be conducted at temperatures lower than the decomposition points of the thermally decomposable foaming agent and the crosslinking agent, especially, at temperatures 20 to 50° C. lower than the 1-min half-life temperature of the crosslinking agent. When the crosslinking is effected by irradiating the blend with ionizing radiation, generally, no crosslinking agent is used.

Alternatively, the unfoamed uncrosslinked rubbery olefinic soft resin can be prepared by simultaneously adding a thermally decomposable foaming agent, a crosslinking agent and other additives to the olefinic copolymer rubber and crystalline polyolefin resin and melt kneading these.

In this method, olefinic copolymer rubber, crystalline polyolefin resin pellets and additives such as a thermally decomposable foaming agent and a crosslinking agent are continuously kneaded together by means of, for example, a twin-screw kneading extruder at temperatures lower than the decomposition points of the thermally decomposable foaming agent and crosslinking agent.

Thereafter, the unfoamed uncrosslinked rubbery olefinic soft resin obtained by the above melt kneading is sheeted at temperatures lower than the decomposition points of the thermally decomposable foaming agent and crosslinking agent to thereby obtain an uncrosslinked unfoamed shaped article.

This shaping can be conducted by means of common shaping equipment such as a hot press or a calendering roll.

Furthermore, in the present invention, the process from the melt kneading of the olefinic copolymer rubber and crystalline polyolefin resin through the melt kneading of the resultant blend along with the additives such as the thermally decomposable foaming agent and crosslinking agent to the shaping of the uncrosslinked unfoamed soft resin obtained by this melt kneading can be accomplished in one stage.

In the present invention, it is preferred that crosslinking be effected at the above stage of the accomplishment of the resin shaping when the shaped article of uncrosslinked unfoamed soft resin obtained by the above step is irradiated with ionizing radiation to thereby crosslink the same.

Examples of suitable ionizing radiations include alpha rays, beta rays, gamma rays, electron beam, neutron beam and X-rays. Of these, electron beam is preferably used. The exposed dose of ionizing radiation generally ranges from 0.5 to 10 Mrad, preferably, from 1 to 5 Mrad.

The crosslinking agent and thermally decomposable foaming agent contained in the shaped article of uncrosslinked unfoamed soft resin obtained by the above process are heated and decomposed by any of conventional common techniques such as hot air circulation heating, salt bath heating, infrared heating and hot press heating to thereby attain the desired crosslinking and foaming. Thus, there is obtained the foamed pad material for low-pressure compression molding according to the present invention.

Alternatively, the thermally decomposable foaming agent contained in the shaped article of unfoamed soft resin having been crosslinked by the irradiation with ionizing radiation is heated and decomposed by any of conventional common techniques such as hot air circulation heating, salt bath heating, infrared heating and hot press heating to thereby attain the desired foaming. Thus, there is obtained the foamed pad material for low-pressure compression molding according to the present invention.

Although the thickness of the thus obtained foamed pad material is generally preferred to be in the range of about 2 to 7 mm, it depends on the use thereof. Further, although the foamed pad material is preferred to be in the form of a continuous sheet from the viewpoint of the easiness of lamination, it may be in the form of a veneer.

A skin material can be laminated to the thus obtained sheet of foamed pad material by heating or with the use of an adhesive. Thus, the skin material lined with the foamed pad material by lamination so as to impart cushioning properties thereto can continuously be produced.

Examples of suitably employed skin materials include soft polyvinyl chloride sheets, ABS-resin-filled polyvinyl chloride sheets, thermoplastic elastomer sheets, synthetic leather sheets, synthetic fiber cloths and nonwoven fabrics. The use of olefinic thermoplastic elastomer sheets as the skin material is especially preferred. The olefinic thermoplastic elastomers have a material quality similar to that of the foamed pad material of the present invention, so that a desired adhesion is realized therebetween by extrusion heat lamination. Even if the compressive force of the foamed pad material of the present invention is too small, the desirable adhesion and grain transfer between the foamed pad material and the skin material can be ensured by increasing the compression ratio. Further, even if passed through the process of extrusion heat lamination, the foamed pad material is composed of a crosslinked elastic foam, so that the desired product thickness can be ensured without unfavorable permanent set. In addition to the realization of desirable adhesion and grain transfer, the olefinic thermoplastic elastomer is very excellent in recycle suitability because of the possession of material quality similar to that of the foamed pad material of the present invention.

Moreover, the above skin material, the foamed pad material of the present invention and a core material resin such as polypropylene resin or ABS resin can directly be subjected to integral molding in a mold of hot stamping apparatus by piling them up in that order and effecting hot stamping molding to thereby enable obtaining a laminate.

Further, the laminate can be formed in the mold of hot stamping apparatus by conducting a preliminary molding of the above skin material by, for example, vacuum compression molding, piling up the preliminarily molded skin material, the foamed pad material of the present invention and the above core material resin in this order and effecting a hot stamping molding.

Effect of the Invention

The foamed pad material for low-pressure compression molding according to the present invention comprises a crosslinked rubbery olefinic soft resin foam and exhibits:

(a) a hysteresis loss of not greater than 40%, (b) a gel fraction of 20 to 98%, and (c) a density of 0.025 to 0.30 g/cm$^3$.

Therefore, the foamed pad material is excellent in heat weldability with core material forming resins and further not only exhibits excellent heat resistance, strain resistance, moldability and restoring properties at the time of low-pressure compression molding at which compression and drawing are conducted at high temperatures but also enables the molded skin material to possess cushioning properties with high flexibility. Moreover, the foamed pad material enables improving the feeling of the molded skin material.

The foamed pad material of the present invention is a crosslinked foam having excellent restoring properties and rubber elasticity with high flexibility, so that it can resist the heating to which the foamed pad material is exposed at the time of low-pressure compression molding and can follow the strain to thereby absorb any thermal and mechanical damages. Thus, desirable moldability can be exhibited.

The foamed pad material of the present invention is not corroded by resins (core material forming resin and skin material forming resin) melted at high temperatures at the time of low-pressure compression molding and is excellent in the molten resin flowability in complex configuration zones. The foamed pad material of the present invention is a rubbery elastic foam, so that the foam is easily flexed at the time of molten resin flow with the result that the molten resin flowability in complex configuration zones is greater than in the use of a highly rigid pad material.

The foamed pad material for low-pressure compression molding according to the present invention has lower density and higher expansion ratio than those of conventional pad materials having been employed in the hot stamping molding, so that its use enables reducing the weight of vehicle interior materials and improving the heat insulating capability thereof.

The present invention will further be illustrated below with reference to the following Examples which in no way limit the scope of the invention.

EXAMPLE

The density (g/cm$^3$), gel fraction (%), 50% compression stress (kgf/cm$^2$), hysteresis loss (%) and permanent set (%) of the foamed pad material were measured by the following respective methods.

Measuring Methods (1) Density (g/cm$^3$)

A 10 cm×10 cm square specimen was cut out from a sheeted foam having a thickness of t cm, and the weight (W g) thereof was accurately measured. The density (g/cm$^3$) was calculated by the following formula:

$$\text{Density (g/cm}^3\text{)} = W/(t \times 10 \times 10).$$

(2) Gel Fraction (%)

A specimen of foamed pad material was cut into 1 mm squares and oil contents were extracted with chloroform from the specimen by means of Soxhlet extractor. After the extraction, the foamed pad material specimen was dried in vacuo, and about 0.2 g was taken out from the dried specimen and accurately weighed ($W_0$ g). The accurately weighed specimen was immersed in 500 cc of xylene heated at 130° C. for 6 hr to thereby leach out hot xylene solubles from the specimen. Thereafter, the xylene insoluble was taken out and washed with acetone. This insoluble was dried in a vacuum dryer heated at 100° C. for 1 hr and the weight of the insoluble was accurately measured ($W_1$ g). The gel fraction (%) was calculated by the following formula:

$$\text{Gel fraction (\%)} = (W_1/W_0) \times 100.$$

(3) 50% Compression Stress (kgf/cm$^2$)

5 cm×5 cm squares were cut out from a sheeted foam having a thickness of t cm, and obtained squares were piled one upon another until the thickness became about 2.5 cm. The resultant specimen was compressed by means of a compression tester at a rate of 50 mm/min at room temperature, and the compression was stopped when the thickness of the specimen was reduced to 50% of that before the compression. 20 sec later, the load (P kgf) was measured. The 50% compression stress (kgf/cm$^2$) was calculated by the following formula:

$$50\% \text{ compression stress (kgf/cm}^2\text{)} = P/(5 \times 5).$$

(4) Hysteresis Loss (%)

5 cm×5 cm squares were cut out from a sheeted foam having a thickness of t cm, and obtained squares were piled one upon another until the thickness became about 2.5 cm. The hysteresis at room temperature of the resultant specimen was measured with the use of a compression tester operated at a compression rate of 50 mm/min at room temperature. The degree of compression was such that the thickness of the specimen was reduced to 50% of that before the compression. The hysteresis curve as shown in FIG. 1 was recorded on a recording paper by the compression test carried out under the above conditions. Referring to FIG. 1, the hysteresis loss (%) was calculated by the following formula:

Hysteresis loss (%)=(S1/S0)×100 wherein:

S1: area enclosed by curves B and D, and

S0: area enclosed by curve B and straight lines AE and CE.

(5) Permanent Set (%)

The thickness ($t_1$) of the foam layer of the foamed pad material covered with the skin layer was measured before the execution of the hot stamping molding. Subsequently, the thickness ($t_2$) of the foam layer was measured after the execution of the hot stamping molding of the above foamed pad material. The permanent set (%) was calculated by the following formula:

Permanent set (%)=[($t_1-t_2$)/$t_1$]×100.

Example 1

10 parts by weight of azodicarbonamide (ADCA: foaming agent), 1 part by weight of 2,5-dimethyl-2,5-di(tert-butylperoxy)hexyne-3 (peroxide crosslinking agent, Perhexyne 25B (trade name) produced by NOF Corporation) and 5 parts by weight of paraffin oil were blended with 100 parts by weight of matrix composed of 100 parts by weight of ethylene/propylene/nonconjugated diene copolymer rubber [EPT, ethylene content: 38 mol %, iodine value: 12, MFR (ASTM 1238, 190° C., load: 2.16 kg): 1.1 g/10 min] at 100° C. on rolls, thereby obtaining an uncrosslinked unfoamed resin composition.

This resin composition was charged in a 1 mm-thick metal mold, and foaming and crosslinking under superatmospheric pressure were carried out at 220° C. Thus, a crosslinked foamed sheet was obtained whose density and thickness were 0.095 g/cm³ and 2.7 mm, respectively.

This crosslinked foamed sheet had a gel fraction of 81.5%, a 50% compression stress of 0.820 kgf/cm² and a hysteresis loss of 8.6% at room temperature.

Thereafter, a 0.6 mm-thick skin material of polyolefinic thermoplastic elastomer was extruded and laminated to the obtained crosslinked foamed sheet, and the resultant laminate and core material forming resin of polypropylene [propylene content: 100 mol.%, MFR (ASTM 1238, 190° C., load: 2.16 kg): 100 g/10 min] were subjected to hot stamping molding conducted under conditions such that the die temperature was 50° C., the applied pressure was 70 kg/cm² and the hot press time was 0.25 min. Thus, a shaped article of excellent appearance was obtained.

With respect to this shaped article, the crosslinked foamed sheet layer was excellent in strain resistance and moldability and the skin material possessed cushioning properties with high flexibility. The permanent set of the crosslinked foamed sheet layer part of the shaped article was 2.4%.

Example 2

10 parts by weight of azodicarbonamide (ADCA), 0.3 part by weight of trimethylolpropane trimethacrylate [TMPT, crosslinking auxiliary] and 5 parts by weight of paraffin oil were blended with 100 parts by weight of matrix composed of 50 parts by weight of the same ethylene/propylene/nonconjugated diene copolymer rubber [EPT] as in Example 1 and 50 parts by weight of polyethylene [PE, ethylene content: 100 mol %, MFR (ASTM 1238, 190° C., load: 2.16 kg): 1.6 g/10 min] at 135° C. by means of a twin-screw extruder, thereby obtaining an unfoamed uncrosslinked sheet of 1 mm in thickness.

This sheet was irradiated with 4 Mrad electron beam to thereby effect crosslinking and heated at 220° C. under atmospheric pressure to thereby effect foaming. Thus, a crosslinked foamed sheet was obtained whose density and thickness were 0.041 g/cm³ and 2.8 mm, respectively.

This crosslinked foamed sheet had a gel fraction of 61.3%, a 50% compression stress of 0.530 kgf/cm² and a hysteresis loss of 25.6% at room temperature.

Thereafter, a shaped article of excellent appearance was obtained in the same manner as in Example 1, except that use was made of this crosslinked foamed sheet.

The crosslinked foamed sheet employed in the preparation of this shaped article was excellent in strain resistance and moldability and the skin material of the shaped article possessed cushioning properties with high flexibility. The permanent set of the crosslinked foamed sheet layer part of the shaped article was 8.2%.

Example 3

10 parts by weight of azodicarbonamide (ADCA), 0.5 part by weight of 2,5-dimethyl-2,5-di(tert-butylperoxy)hexyne-3 (peroxide crosslinking agent) and 5 parts by weight of paraffin oil were blended with 100 parts by weight of matrix composed of 60 parts by weight of the same ethylene/propylene/nonconjugated diene copolymer rubber [EPT] as in Example 1, 30 parts by weight of the same polyethylene [PE] as in Example 2 and 10 parts by weight of polypropylene [PP, propylene content: 100 mol %, MFR (ASTM 1238, 190° C., load: 2.16 kg): 5.0 g/10 min] at 135° C. by means of a twin-screw extruder, thereby obtaining an uncrosslinked unfoamed resin composition of 1.5 mm in thickness.

This resin composition was heated at 220° C. under atmospheric pressure to thereby effect crosslinking and foaming. Thus, a crosslinked foamed sheet was obtained whose density and thickness were 0.037 g/cm³ and 3.1 mm, respectively.

This crosslinked foamed sheet had a gel fraction of 22.5%, a 50% compression stress of 0.510 kgf/cm² and a hysteresis loss of 21.2% at room temperature.

Thereafter, a shaped article of excellent appearance was obtained in the same manner as in Example 1, except that use was made of this crosslinked foamed sheet.

The crosslinked foamed sheet employed in the preparation of this shaped article was excellent in strain resistance and moldability and the skin material of the shaped article possessed cushioning properties with high flexibility. The permanent set of the crosslinked foamed sheet layer part of the shaped article was 11.4%.

Example 4

10 parts by weight of azodicarbonamide (ADCA), 1 part by weight of 2,5-dimethyl-2,5-di(tert-butylperoxy)hexyne-3 (peroxide crosslinking agent), 0.3 part by weight of trimethylolpropane trimethacrylate [TMPT] and 5 parts by weight of paraffin oil were blended with 100 parts by weight of matrix composed of 60 parts by weight of the same ethylene/propylene/nonconjugated diene copolymer rubber [EPT] as in Example 1, 30 parts by weight of the same polyethylene [PE] as in Example 2 and 10 parts by weight of the same polypropylene [PP] as in Example 3 at 135° C. by means of a twin-screw extruder, thereby obtaining an uncrosslinked unfoamed resin composition of 1 mm in thickness.

This resin composition was heated at 220° C. under atmospheric pressure to thereby effect crosslinking and foaming. Thus, a crosslinked foamed sheet was obtained whose density and thickness were 0.043 g/cm³ and 2.9 mm, respectively.

This crosslinked foamed sheet had a gel fraction of 64.5%, a 50% compression stress of 0.630 kgf/cm² and a hysteresis loss of 14.1% at room temperature.

Thereafter, a shaped article of excellent appearance was obtained in the same manner as in Example 1, except that use was made of this crosslinked foamed sheet.

The crosslinked foamed sheet employed in the preparation of this shaped article was excellent in strain resistance and moldability and the skin material of the shaped article possessed cushioning properties with high flexibility. The permanent set of the crosslinked foamed sheet layer part of the shaped article was 2.6%.

Example 5

The 1 mm-thick uncrosslinked unfoamed resin composition obtained by the same procedure as in Example 4 was foamed under superatmospheric pressure in the same manner as in Example 1. Thus, a crosslinked foamed sheet was obtained whose density and thickness were 0.077 g/cm³ and 2.9 mm, respectively.

This crosslinked foamed sheet had a gel fraction of 91.3%, a 50% compression stress of 1.374 kgf/cm² and a hysteresis loss of 27.9% at room temperature.

Thereafter, a shaped article of excellent appearance was obtained in the same manner as in Example 1, except that use was made of this crosslinked foamed sheet.

The crosslinked foamed sheet employed in the preparation of this shaped article was excellent in strain resistance and moldability and the skin material of the shaped article possessed cushioning properties with high flexibility. The permanent set of the crosslinked foamed sheet layer part of the shaped article was 3.7%.

Example 6

The 1 mm-thick uncrosslinked unfoamed resin composition was obtained in the same manner as in Example 4, except that the amounts of added ethylene/propylene/nonconjugated diene copolymer rubber [EPT], polyethylene [PE] and polypropylene [PP] were changed to 70 parts by weight, nil and 30 parts by weight, respectively.

This resin composition was heated at 220° C. under atmospheric pressure to thereby effect crosslinking and foaming. Thus, a crosslinked foamed sheet was obtained whose density and thickness were 0.052 g/cm³ and 3.2 mm, respectively.

This crosslinked foamed sheet had a gel fraction of 63.4%, a 50% compression stress of 0.531 kgf/cm² and a hysteresis loss of 16.5% at room temperature.

Thereafter, a shaped article of excellent appearance was obtained in the same manner as in Example 1, except that use was made of this crosslinked foamed sheet.

The crosslinked foamed sheet employed in the preparation of this shaped article was excellent in strain resistance and moldability and the skin material of the shaped article possessed cushioning properties with high flexibility. The permanent set of the crosslinked foamed sheet layer part of the shaped article was 7.6%.

Example 7

The 1 mm-thick uncrosslinked unfoamed resin composition was obtained in the same manner as in Example 4, except that the amounts of added ethylene/propylene/nonconjugated diene copolymer rubber [EPT], polyethylene [PE] and polypropylene [PP] were changed to 50 parts by weight, 50 parts by weight and nil, respectively.

This resin composition was foamed under superatmospheric pressure in the same manner as in Example 1. Thus, a crosslinked foamed sheet was obtained whose density and thickness were 0.094 g/cm³ and 2.9 mm, respectively.

This crosslinked foamed sheet had a gel fraction of 85.1%, a 50% compression stress of 1.450 kgf/cm² and a hysteresis loss of 23.1% at room temperature.

Thereafter, a shaped article of excellent appearance was obtained in the same manner as in Example 1, except that use was made of this crosslinked foamed sheet.

The crosslinked foamed sheet employed in the preparation of this shaped article was excellent in strain resistance and moldability and the skin material of the shaped article possessed cushioning properties with high flexibility. The permanent set of the crosslinked foamed sheet layer part of the shaped article was 3.5%.

Example 8

The 1 mm-thick uncrosslinked unfoamed resin composition was obtained in the same manner as in Example 4, except that the amounts of added ethylene/propylene/nonconjugated diene copolymer rubber [EPT], polyethylene [PE] and polypropylene [PP] were changed to 30 parts by weight, 70 parts by weight and nil, respectively.

This resin composition was heated at 220° C. under atmospheric pressure to thereby effect crosslinking and foaming. Thus, a crosslinked foamed sheet was obtained whose density and thickness were 0.045 g/cm³ and 3.2 mm, respectively.

This crosslinked foamed sheet had a gel fraction of 55.3%, a 50% compression stress of 0.750 kgf/cm² and a hysteresis loss of 30.5% at room temperature.

Thereafter, a shaped article of excellent appearance was obtained in the same manner as in Example 1, except that use was made of this crosslinked foamed sheet.

The crosslinked foamed sheet employed in the preparation of this shaped article was excellent in strain resistance and moldability and the skin material of the shaped article possessed cushioning properties with high flexibility. The permanent set of the crosslinked foamed sheet layer part of the shaped article was 12.5%.

Comparative Example 1

7 parts by weight of azodicarbonamide (ADCA), 1.0 part by weight of 2,5-dimethyl-2,5-di(tert-butylperoxy)hexyne-3 (peroxide crosslinking agent), 0.3 part by weight of trimethylolpropane trimethacrylate [TMPT] and 5 parts by weight of paraffin oil were blended with 100 parts by weight of matrix composed of 100 parts by weight of the same polyethylene [PE] as in Example 2 at 135° C. by means of a twin-screw extruder, thereby obtaining an uncrosslinked unfoamed resin composition of 1 mm in thickness.

This resin composition was heated at 220° C. under atmospheric pressure to thereby effect crosslinking and foaming. Thus, a crosslinked foamed sheet was obtained whose density and thickness were 0.0953 g/cm³ and 2.9 mm, respectively.

This crosslinked foamed sheet had a gel fraction of 51.5%, a 50% compression stress of 2.100 kgf/cm² and a hysteresis loss of 50.1% at room temperature.

Thereafter, a shaped article was obtained in the same manner as in Example 1, except that use was made of this crosslinked foamed sheet.

The crosslinked foamed sheet employed in the preparation of this shaped article had poor strain resistance and grave permanent set, so that the skin material of the shaped article possessed neither cushioning properties nor flexibility. Moreover, the surface of the shaped article was irregular at places, so that the appearance thereof was poor. The permanent set of the crosslinked foamed sheet layer part of the shaped article was 33.4%.

Comparative Example 2

The 1 mm-thick uncrosslinked unfoamed resin composition was obtained in the same manner as in Example 2, except that 100 parts by weight of the same polypropylene [PP] as in Example 3 was used in place of 50 parts by weight of ethylene/propylene/nonconjugated diene copolymer rubber [EPT] and 50 parts by weight of polyethylene.

The resultant sheet was irradiated with 4 Mrad electron beam to thereby effect crosslinking and heated at 220° C. under atmospheric pressure to thereby effect foaming. Thus, a crosslinked foamed sheet was obtained whose density and thickness were 0.0714 g/cm$^3$ and 2.9 mm, respectively.

This crosslinked foamed sheet had a gel fraction of 65.7%, a 50% compression stress of 1.630 kgf/cm$^2$ and a hysteresis loss of 49.8% at room temperature.

Thereafter, a shaped article was obtained in the same manner as in Example 1, except that use was made of this crosslinked foamed sheet.

Although the crosslinked foamed sheet employed in the preparation of this shaped article had good strain resistance, the skin material of the shaped article had not cushioning properties and was very hard. The permanent set of the crosslinked foamed sheet layer part of the shaped article was 8.2%.

What is claimed is:

1. A foamed pad material for low-pressure compression molding which comprises a crosslinked rubbery olefinic soft resin foam, wherein the crosslinked rubbery olefinic soft resin foam comprises an ethylene/α-olefin/nonconjugated diene copolymer rubber and exhibits:
   (a) a hysteresis loss of not greater than 40%,
   (b) a gel fraction of 20 to 98%, and
   (c) a density of 0.025 to 0.095 g/cm$^3$.

2. The foamed pad material for low-pressure compression molding as claimed in claim 1, wherein the crosslinked rubbery olefinic soft resin foam is formed from a rubbery olefinic soft resin consisting essentially of an ethylene/propylene/nonconjugated diene copolymer rubber.

3. A foamed pad material for low-pressure compression molding which comprises a crosslinked rubbery olefinic soft resin foam, wherein the crosslinked rubbery olefinic soft resin foam is formed from a rubbery olefinic soft resin which is a blend consisting essentially of an ethylene/α-olefin/nonconjugated diene copolymer rubber and a crystalline polyolefin resin and exhibits:
   (a) a hysteresis loss of not greater than 40%,
   (b) a gel fraction of 20 to 98%, and
   (c) a density of 0.025 to 0.095 g/cm$^3$.

4. The foamed pad material for low-pressure compression molding as claimed in claim 3, which further exhibits (d) a 50% compression stress of 0.3 to 1.5 kg/cm$^2$.

5. The foamed pad material as claimed in claim 3, wherein the α-olefin/nonconjugated diene copolymer rubber is in an amount of 30 to less than 100 parts by weight, based on 100 parts by weight of the blend.

6. The foamed pad material as claimed in claim 3, wherein the α-olefin/nonconjugated diene copolymer rubber is in an

TABLE 1

|  | Ex. 1 | Ex. 2 | Ex. 3 | Ex. 4 | Ex. 5 | Ex. 6 | Ex. 7 | Ex. 8 | Comp. Ex. 1 | Comp. Ex. 2 |
|---|---|---|---|---|---|---|---|---|---|---|
| Components of uncrosslinked unfoamed resin composition [parts by weight] | | | | | | | | | | |
| EPT | 100 | 50 | 60 | 60 | 60 | 70 | 50 | 30 | — | — |
| PE | — | 50 | 30 | 30 | 30 | — | 50 | 70 | 100 | — |
| PP | — | — | 10 | 10 | 10 | 30 | — | — | — | 100 |
| ADCA | 10 | 10 | 10 | 10 | 10 | 10 | 10 | 10 | 7 | 10 |
| Perhexyne 25B | 1 | — | 0.5 | 1 | 1 | 1 | 1 | 1 | 1 | — |
| TMPT | — | 0.3 | — | 0.3 | 0.3 | 0.3 | 0.3 | 0.3 | — | 0.3 |
| Paraffin oil | 5 | — | 5 | 5 | 5 | 5 | 5 | 5 | 5 | — |
| Exposed dose of electron beam [Mrad] | — | 4 | — | — | — | — | — | — | — | 4 |
| Method of crosslining and foaming | super-atom. pressure | atm. pressure | atm. pressure | atm. pressure | super-atm. pressure | atm. pressure | super-atm. pressure | atm. pressure | atm. pressure | atm. pressure |
| Crosslinked foamed sheet | | | | | | | | | | |
| Thickness [mm] | 2.7 | 2.8 | 3.1 | 2.9 | 2.9 | 3.2 | 2.9 | 3.2 | 2.9 | 2.9 |
| Density [g/cm$^3$] | 0.095 | 0.041 | 0.037 | 0.043 | 0.077 | 0.052 | 0.094 | 0.045 | 0.0953 | 0.0714 |
| Hysteresis loss [%] | 8.6 | 25.6 | 21.2 | 14.1 | 27.9 | 16.5 | 23.1 | 30.5 | 50.1 | 49.8 |
| Gel fraction [%] | 81.5 | 61.3 | 22.5 | 64.5 | 91.3 | 63.4 | 85.7 | 55.3 | 51.5 | 65.7 |
| 50% compression stress [kgf/cm$^2$] | 0.820 | 0.530 | 0.510 | 0.630 | 1.374 | 0.531 | 1.450 | 0.750 | 2.100 | 1.630 |
| Closed cell ratio [%] | 51.5 | 64.2 | 28.5 | 36.7 | 84.1 | 61.5 | 78.9 | 70.4 | 95.4 | 98.1 |
| Crystallinity [%] | 3 | 18 | 11 | 13 | 11 | 15 | 18 | 25 | 45 | 65 |
| Permanent set [%] | 2.4 | 8.2 | 11.4 | 2.6 | 3.7 | 7.6 | 3.5 | 12.5 | 33.4 | 8.2 |
| Flexibility | very exellent feeling | very exel. feel. | very exel. feel. | very exel. feel. | very exellent feeling | good feeling | very exellent feeling | good feeling | very bad feeling | very bad feeling |

(Note 1)
Flexibility: feeling of the skin material molded by hot stamping; Classified into Very excellent feeling, Good feeling, Bad feeling and Very bad feeling amount of 50 to less than 100 parts by weight, based on 100 parts by weight of the blend.

7. A foamed pad material for low-pressure compression molding which comprises a crosslinked rubbery soft resin foam and exhibits:

(a) a hysteresis loss of not greater than 40%, (b) a gel fraction of 20–98%, (c) a density of 0.025 to 0.095 g/cm$^3$, wherein the crosslinked rubbery olefinic soft resin foam is formed from a rubbery olefinic soft resin which is a blend consisting essentially of 30 to 100 parts by weight of ethylene/α-olefin/nonconjugated diene copolymer resin, in which the molar ratio of ethylene to α-olefin is 90/10 to 50/50; and 0 to 70 parts by weight of a crystalline polyolefin resin, based on 100 parts by weight of the blend.

8. The foamed pad material as claimed in claim 7, wherein the ethylene/α-olefin/nonconjugated diene copolymer resin is in an amount of 65 to 95 parts by weight and the crystalline polyolefin resin is in an amount of 5 to 35 parts by weight of the blend.

9. The foamed pad material for low-pressure compression molding as claimed in claim 7, which further exhibits (d) a 50% compression stress of 0.3 to 1.5 kg/cm$^2$.

10. The foamed pad material as claimed in claim 7, wherein the crystalline polyolefin resin is a member selected from the group consisting of polyethylene, polypropylene and mixtures thereof.

11. The foamed pad material as claimed in claim 7, wherein the foamed pad has a permanent set of 2.4 to 12.5%.

12. A foamed pad material for low-pressure compression molding which comprises a crosslinked rubbery soft resin foam and exhibits:

(a) a hysteresis loss of not greater than 40%, (b) a gel fraction of 20 to 98%, (c) a density of 0.025 to 0.095 g/cm$^3$, (d) a 50% compression stress of 0.3 to 1.5 kg/cm$^2$, wherein the crosslinked rubbery olefinic soft resin foam is formed from a rubbery olefinic soft resin which is a blend of 30 to 100 parts by weight of an ethylene/α-olefin/nonconjugated diene copolymer resin, in which the molar ratio of ethylene to α-olefin is 90/10 to 50/50; and 0 to 70 parts by weight of a crystalline polyolefin resin, based on 100 parts by weight of the blend.

13. The foamed pad material as claimed in claim 12, wherein the ethylene/α-olefin/nonconjugated diene copolymer resin is ethylene/propylene/nonconjugated diene copolymer resin and is in an amount of 30 to less than 100 parts by weight and the crystalline polyolefin resin is in an amount of more than 0 to less than 70 parts by weight of the blend.

14. The foamed pad material as claimed in claim 12, wherein the crystalline polyolefin resin is a member selected from the group consisting of polyethylene, polypropylene and mixtures thereof.

15. The foamed pad material as claimed in claim 12, wherein the foamed pad has a permanent set of 2.4 to 12.5%.

16. A foamed pad material for low-pressure compression molding which comprises a crosslinked rubbery soft resin foam consisting essentially of an ethylene/α-olefin/nonconjugated diene copolymer resin and a crystalline polyolefin resin, in which the molar ratio of ethylene to α-olefin is 90/10 to 50/50, and the nonconjugated diene is a member selected from the group consisting of dicyclopentadiene, 1,4-hexadiene, cyclooctadiene, methylenenorbornene and ethylidenenorbornene, and the crosslinked rubber soft resin foam exhibits the following properties:

(a) a hysteresis loss of not greater than 40%, (b) a gel fraction of 20–98%, (c) a density of 0.025 to 0.095 g/cm$^3$, and (d) a 50% compression stress of 0.3 to 1.5 kg/cm$^2$.

17. The foamed pad material as claimed in claim 16, wherein the nonconjugated diene consists essentially of dicyclopentadiene.

18. The foamed pad material of claim 16 wherein the crosslinked rubbery soft resin contains 10 to 70 parts by weight, base on 100 parts by weight of the blended resins, of the crystalline polyolefin resin selected from the group consisting of polyethylene, polypropylene and mixtures thereof.

19. A foamed pad material for low pressure compression molding which comprises a crosslinked rubbery soft resin foam consisting essentially of an ethylene/propylene/nonconjugated diene copolymer resin and a crystalline polyolefin resin, in which the molar ratio of ethylene to propylene is 90/10 to 50/50, and the nonconjugated diene is a member selected from the group consisting of dicyclopentadiene, 1,4-hexadiene, cyclooctadiene, methylenenorbornene and ethylidenenorbornene, and the crosslinked rubbery soft resin foam exhibits the following properties:

(a) a hysteresis loss of not greater than 40%, (b) a gel fraction of 20–98%, (c) a density of 0.025 to 0.095 g/cm$^3$, (d) a 50% compression stress of 0.3 to 1.5 kg/cm$^2$, and (e) a permanent set of 2.4 to 12.5%.

20. The foamed pad material as claimed in claim 19 wherein the nonconjugated diene consists essentially of dicyclopentadiene.

21. The foamed pad material as claimed in claim 19 wherein the crosslinked rubbery soft resin contains 10 to 50 parts by weight, based on 100 parts by weight of the blended resin, of the crystalline polyolefin resin selected from the group consisting of polyethylene, polypropylene and mixtures thereof.

22. A hot-stamped molded article comprising a skin material, a foamed pad material and a core material, wherein said foamed pad material comprises a crosslinked rubbery olefinic soft resin foam, wherein the crosslinked rubbery olefinic soft resin foam comprises an ethylene/α-olefin/nonconjugated diene copolymer rubber and exhibits:

(a) a hysteresis loss of not greater than 40%, (b) a gel fraction of 20 to 98%, and (c) a density of 0.025 to 0.095 g/cm$^3$.

* * * * *